Oct. 27, 1925.  
W. KLUMP  
1,558,486  
AUXILIARY SPRING FOR CONTROLLING LEVERS ON MOTOR VEHICLES AND THE LIKE  
Filed June 25, 1924

Inventor.  
William Klump  
by Lawrence S. Paddock  
his Attorney.

Patented Oct. 27, 1925.

1,558,486

UNITED STATES PATENT OFFICE.

WILLIAM KLUMP, OF WEST ORANGE, NEW JERSEY, ASSIGNOR OF ONE-THIRD TO JOHN WILLIAM WEED, OF ORANGE, NEW JERSEY, AND ONE-THIRD TO GUSTAVUS R. WEED, OF EAST ORANGE, NEW JERSEY.

AUXILIARY SPRING FOR CONTROLLING LEVERS ON MOTOR VEHICLES AND THE LIKE.

Application filed June 25, 1924. Serial No. 722,216.

*To all whom it may concern:*

Be it known that I, WILLIAM KLUMP, a citizen of the United States, residing at West Orange, New Jersey, have invented a new and useful Improvement in Auxiliary Springs for Controlling Levers on Motor Vehicles and the like, of which the following is a specification.

This invention relates to an auxiliary spring for the retaining mechanism on lever controls of motor vehicles and the like.

The preferred form herein shown is particularly useful on the brake lever of Ford cars wherein the same lever operates the emergency brake and holds the change speed foot pedal in neutral position. It is important that the spring which presses the retaining mechanism, which is usually a catch or pawl into its co-operating notch, be in working order so that the brakes will remain set and the clutch held in neutral position when this operation is desired. It often happens that the regular spring for this purpose becomes fatigued and breaks, thus preventing the proper functioning of the controlling mechanism and consequently the operation of the vehicle. When this occurs, my auxiliary spring may be put in place, which renders the proper operation of the controlling lever and associated mechanism again possible.

Figure 1:
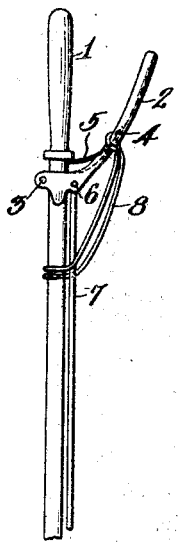
Figure 2:
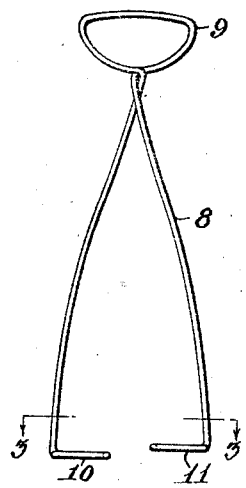
Figure 3:
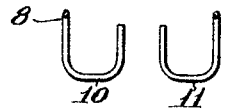

In the drawings, Fig. 1 is a side elevation of the brake lever on a Ford car showing my auxiliary spring in position. Fig. 2 is a side elevation of my auxiliary spring, and Fig. 3 is a plan view of the lower end of the auxiliary spring taken on line 3—3, Fig. 2.

1 is a hand-operated lever which in the case of a Ford car operates the emergency brakes and holds the change speed operating pedal in neutral position. On the lever 1 is mounted a pawl operating mechanism which is composed of a hand piece 2 pivoted at 3. Attached to the hand piece 2 at the point 4 is a leaf spring 5. The leaf spring 5 normally acts to press the hand piece 2 outwardly. The hand piece 2 is pivotally attached at 6 to a rod 7. The rod 7 is attached to the pawl of a pawl and ratchet, not shown, which holds the lever 1 in the desired position. In a Ford car the lever 1 is mounted at the lower end on a shaft which carries a sector arm which co-operates with the change speed operating mechanism in such a manner that when the lever 1 is operated to place the emergency brakes in operation, the change speed operating mechanism is retained in neutral position.

It is a common experience that the spring 5 becomes fatigued and breaks, in which case the hand piece 2 is no longer pressed outwardly to hold the pawl attached to the rod 7 in engagement with the ratchet.

To avoid the injurious consequences of the breaking of the spring 5 I have provided a spring 8 which is slipped over the hand piece 2 and attached to the lever 1 as shown in Fig. 1. The spring 8 is preferably made of spring wire which is twisted at the upper end into a loop 9 such as will slip over and snugly fit the hand piece 2. The lower ends of the wire are bent at an angle to the plane of the loop into open ended hooks 10 and 11, as shown in Figs. 2 and 3. The hook 11 is formed in a plane slightly above the plane of the hook 10. The spring 8 is shown in Fig. 2 in a relaxed position. When the spring 8 is placed in position for operation the loop 9 is slipped over the hand piece 2 and the hooks 10 and 11 are slipped around the lever 1 in a position one over the other, as shown in Fig. 1. This bends the spring 8 and places an outward pull on the hand piece 2, causing it to act through the rod 7 to urge the retaining pawl into its cooperating ratchet.

It will be seen that the spring 8 serves every purpose of the spring 5 and is easily and quickly placed in operative position without the use of any special tool. The spring 8 may be carried in reserve and be ready for immediate use in case of a breakage of the spring 5. I have found that the spring 8 is not subject to breakage like the spring 5 as the form of the spring 8 does not fatigue in the same manner as spring 5.

My auxiliary spring may be used permanently as well as in an auxiliary manner, if it is so desired.

Having described my invention, what I claim is:

1. In a device of the character described, an operating lever, a lever pivotally mounted on said operating lever, a resilient member between said pivotally mounted lever and said operating lever having one end formed into a closed loop adapted to pass over and around said pivotally mounted lever and its other end so formed as to grip said operating lever, adapted to force said pivotally mounted lever into operative position.

2. In a device of the character described, an operating lever, a lever pivotally mounted on said operating lever, a resilient member between said pivotally mounted lever and said operating lever having one end formed into a closed loop adapted to pass over and around said pivotally mounted lever and its other end hook-shaped so as to pass around said operating lever, adapted to force said pivotally mounted lever into operative position.

3. In a device of the character described, an operating lever, a lever pivotally mounted on said operating lever, a spring between said pivotally mounted lever and said operating lever, said spring being formed of a resilient wire having one end formed into a closed loop adapted to pass over and around said pivotally mounted lever, and its free ends formed into hooks adapted to pass around said operating lever in such a manner as to place a pressure on said pivotally mounted lever to force it into operative position.

4. In a device of the character described, an operating lever, a lever pivotally mounted on said operating lever, a spring between said pivotally mounted lever and said operating lever, said spring being formed of a resilient wire having one end formed into a closed loop adapted to pass over and around said pivotally mounted lever and its free ends formed into hooks at an angle to the plane of said loop and adapted to pass around said operating lever in such a manner as to place a pressure on said pivotally mounted lever to force it into operative position.

5. An article of manufacture comprising a spring having one end formed into a closed loop and the other end into a hook at an angle to the plane of said loop.

6. An article of manufacture comprising a spring composed of a resilient wire formed into a closed loop at one end and having the free ends formed into hooks at an angle to the plane of said loop.

7. An article of manufacture comprising a spring composed of a resilient wire formed into a closed loop at one end and having its free ends formed into hooks in planes superimposed and at an angle to the plane of said loop.

In testimony whereof, I have signed my name to this specification this 16th day of June 1924.

WILLIAM KLUMP.